May 30, 1967  O. E. SEIFERTH ET AL  3,322,614
LAMINATED PACKAGING MATERIAL AND METHOD OF FORMING SAME
Filed March 21, 1963  3 Sheets-Sheet 3
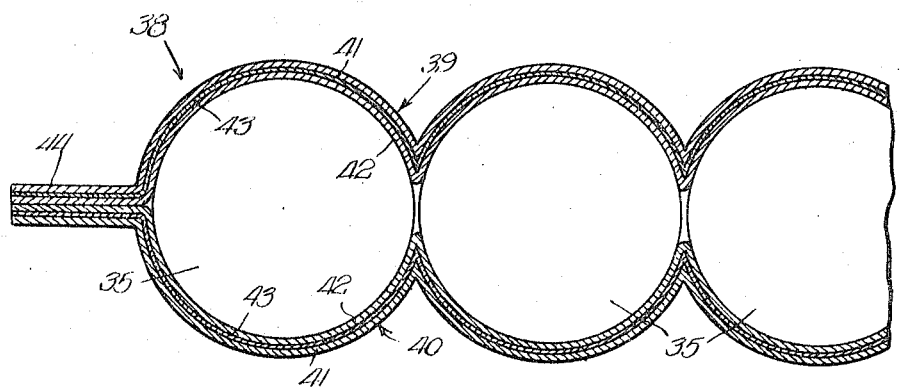
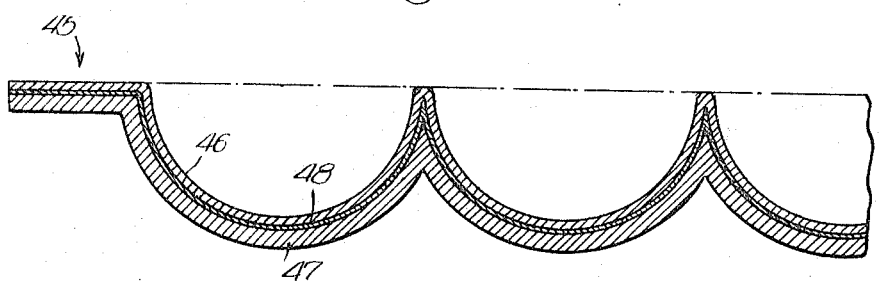
Inventors:
Oscar E. Seiferth,
Paul E. Grindrod,
Forrest H. Hamm,
Robert L. Goller,
Maurice J. Gifford, United States Patent Office 3,322,614
Patented May 30, 1967

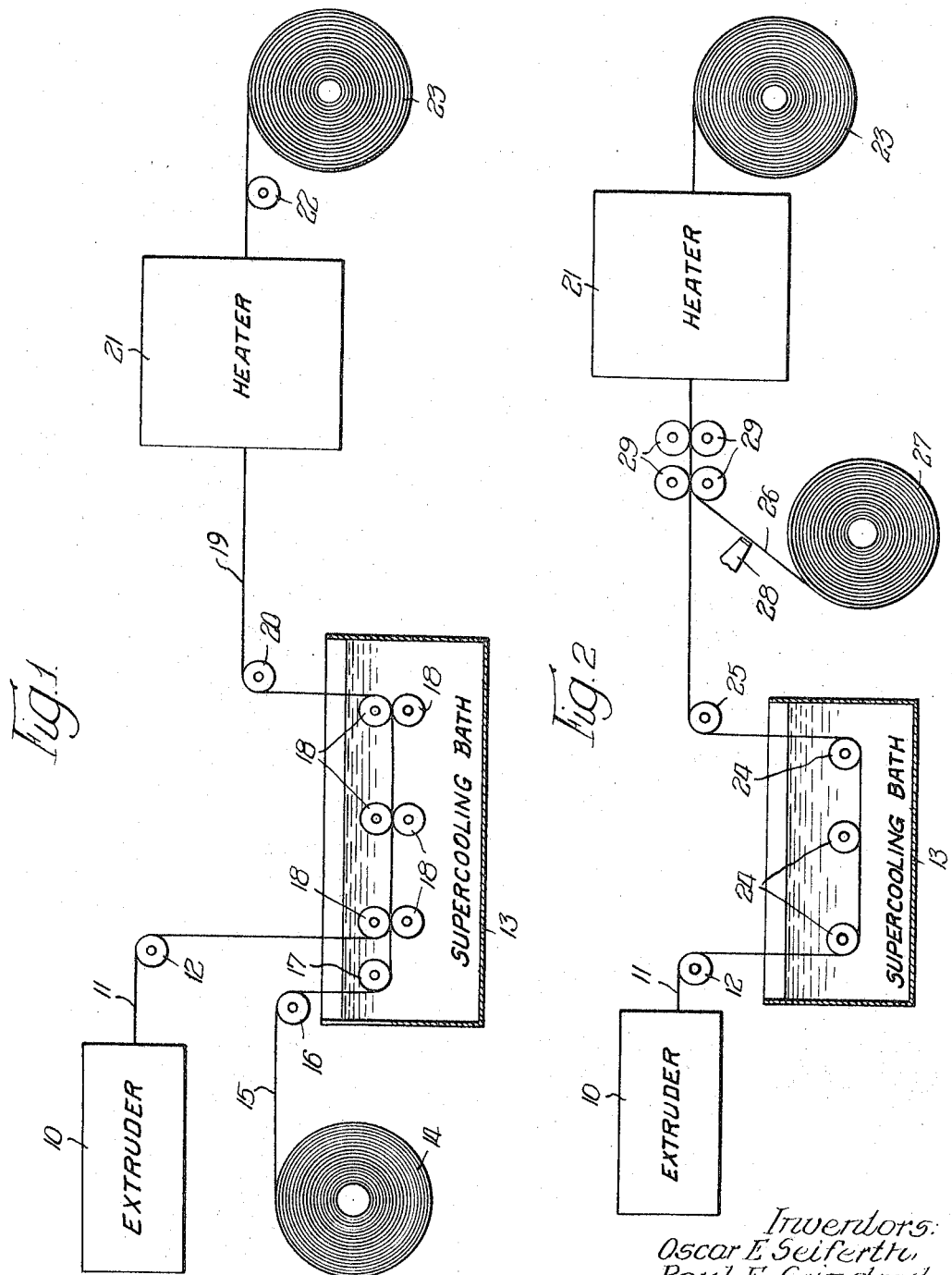

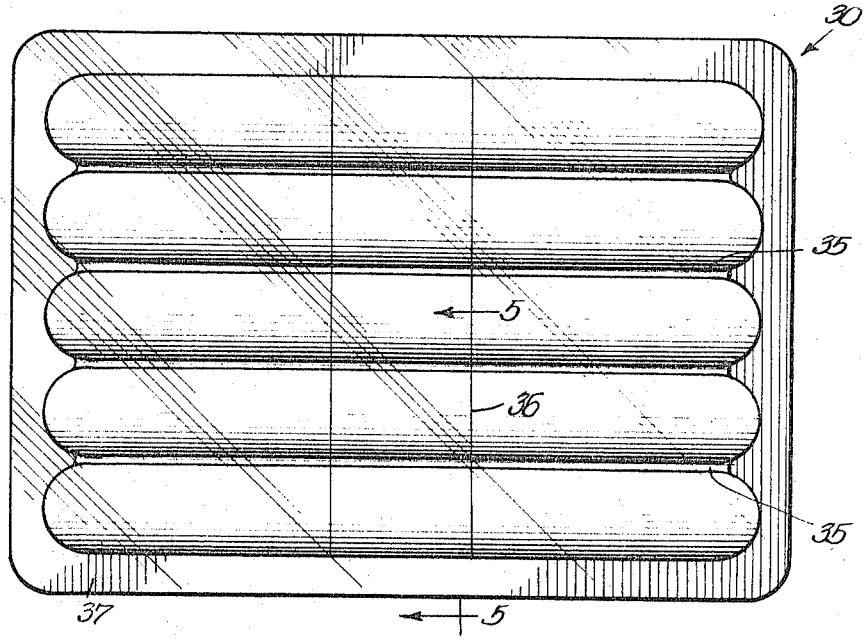
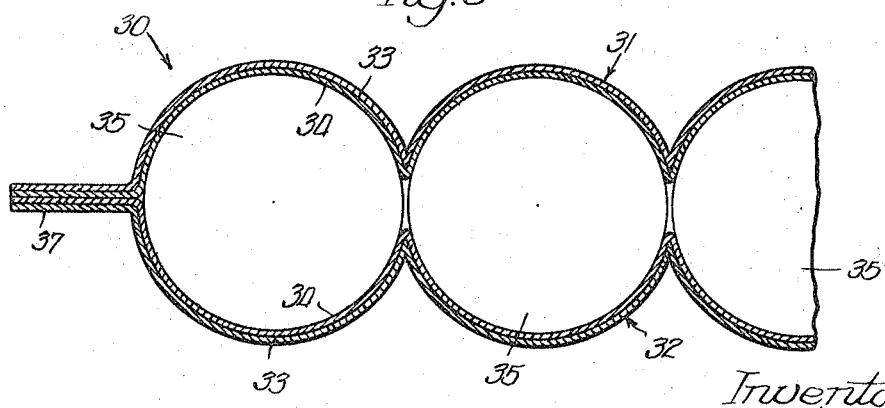

3,322,614
LAMINATED PACKAGING MATERIAL AND
METHOD OF FORMING SAME
Oscar E. Seiferth, Paul E. Grindrod, Forrest D. Hamm, Robert L. Goller, and Maurice J. Gifford, Madison, Wis., assignors to Oscar Mayer & Co., Inc., Chicago, Ill., a corporation of Illinois
Filed Mar. 21, 1963, Ser. No. 267,026
7 Claims. (Cl. 161—254)

This invention relates to new and improved forms of packaging materials and the method of forming these materials. More specifically, the invention is directed to the preparation of new and improved laminated stock involving as a basic part thereof a polyvinylidene chloride type film in specially controlled crystalline condition.

Polyvinylidene chloride films, commonly known as Saran, are used extensively in the packaging field particularly with regard to the packaging of oxygen sensitive materials such as food products. This film is adequately flexible, subject to heat sealing, and is highly effectively impermeable particularly with regard to air and oxygen. Polyvinylidene chloride film exhibits very unique properties in its amorphous or "supercooled" condition. Basically, the film in its amorphous condition can be adequately handled with care for packaging purposes and is "self-fusing" and thus capable of forming a hermetic seal without substantial pressure and without the application of heat merely upon the contacting of supercooled portions of the film. Many products have been advantageously packaged as a result of the utilization of the unique supercooled properties of this material, the packaging procedures generally involving the immediate supercooling of the freshly extruded film in a water bath maintained at about room temperature, immediately thereafter enclosing a product between film portions, collapsing the film portions about the product to result in the contact between supercooled portions of the film to establish a hermetic seal, and then crystallizing the film of the finished package such as by heating the same to adequately overcome or remove the self-fusing properties thereof.

Generally speaking, the polyvinylidene chloride film in its final crystallized form following the general procedure set forth above exhibits substantially random crystal distribution throughout providing that no substantial stretching of the film occurs during package formation. In this respect it has been found that a somewhat substantial stretching of the supercooled film tends to induce crystallization thereof even though the film is maintained at supercooled temperatures, the crystallization tending toward patterns of crystal orientation and resulting in a reducing or elimination of the self-sealing or fusing property. In its amorphous state, the film is also highly flexible and stretchable and can be substantially elongated in any direction, but any substantial stretching will at least induce orientated crystal formation which will eventually eliminate the unique sealing property. This use of the film in a manner to take advantage of its self-sealing property imposes certain limitations and restrictions.

For example, automatic package forming apparatus utilizing supercooled polyvinylidene chloride film must be directly associated with film extrusion means so that the film can be used rather immediately while it still exhibits the desired supercooled properties. This adds to the intricacies of automatic packaging as the apparatus is dependent to a large extent on continued efficient functioning of extrusion equipment. The supercooled properties can be indefinitely retained by following the procedure of immediately supercooling the film upon extrusion thereof and then storing the film under controlled generally low temperature conditions to maintain the supercooled properties thereof. However, the inherent tackiness of the film in its supercooled condition necessitates rather elaborate and carefully controlled film handling and storage and in many instances it is not considered practical to follow this procedure not only from the standpoint of storage problems, but also from the standpoint of subsequent handling of the film during feeding thereof into automatic packaging equipment.

As previously mentioned, supercooled polyvinylidene chloride film is highly flexible, stretchable and formable. However, careful control over the stretching of the film must be maintained during the packaging operation in order to prevent undesirable loss of the self-sealing property. Polyvinylidene chloride film is available and widely used for packaging purposes in its crystallized condition, this condition exhibiting crystal orientation throughout the film. The film is adequately flexible and can be readily heat sealed in accordance with conventional practices, but the film in its oriented crystalline condition is not readily formable or stretchable within the meaning of these terms in the art. For example, oriented crystalline film has been found to exhibit an elongation of approximately 40% to 60%. In an attempt to improve the stretchability of oriented film, a pre-shrinking procedure has been utilized wherein the film is treated in warm water just prior to packaging or laminating use thereof. It has been found in certain instances that pre-shrunk oriented film exhibits an elongation of between about 50% to 90%.

Even the pre-shrunk film does not compare too well with other widely used types of packaging films. A commercial laminate of Mylar (polyethylene terephthalate) coated with a polyvinylidene chloride film laminated with polyethylene film will exhibit an elongation on the order of from 100% to 130%. Another commercially used film formed from oriented pre-shrunk polyvinylidene chloride laminated by an adhesive to polyethylene may exhibit an elongation on the order of from about 110% to 150%. The increased degree of stretchability adds materially to the efficiency and versatility of use of a packaging film. This is of particular importance in the food industry where products such as wieners are packaged on automatic apparatus which utilizes a series of moving cavity-type packaging dies into which films are drawn and the product is received, the package being automatically evacuated accompanied by simultaneous or generally immediate final sealing of the package. With such apparatus one of the primary goals is that of forming a tight film package wherein the film closely engages the product for the purpose of not only establishing a generally rigid package capable of ready handling, but also to provide a relatively tight film thus eliminating rupture as a result of substantial flexing thereof or catching of loose portions thereof. Naturally, with a greater degree of elongation in a packaging film, there is a greater margin of safety during operation of automatic packaging apparatus to avoid film breakage.

It is an object of the invention to provide a new and improved form of laminated stock for packaging use, the stock including at least one film layer of polyvinylidene chloride type film which exhibits substantially random crystal distribution throughout.

Another object is to provide a new and improved laminated stock for packaging purposes, the stock having as a part thereof polyvinylidene chloride film which has been laminated with a dissimilar plastic material, such as a flexible film or rigid substrate, the polyvinylidene chloride film exhibiting substantially random crystal distribution throughout by reason of having been laminated with the dissimilar plastic material while in the amorphous supercooled condition.

Still a further object is to provide a new and improved specially formed laminated stock for packaging use, which stock exhibits high gas impermeability and improved stretchability or formability, the stock including as a part thereof polyvinylidene film which exhibits substantially random crystal distribution throughout.

A further object is to provide a new and improved method of forming a laminated stock of the type described in the foregoing objects.

Other objects not specifically set forth will become apparent from the following detailed description of the invention made in conjunction with the accompanying drawings wherein;

FIG. 1 is a diagrammatic illustration of a procedure which can be followed in the preparation of laminated stock of the invention, this procedure constituting a part of the invention;

FIG. 2 is a diagrammatic illustration of a modified procedure also constituting a part of the invention;

FIG. 3 is a plan view of one type of package which can be readily formed using the laminated stock of the invention;

FIG. 4 is a side elevation of the package of FIG. 3;

FIG. 5 is an enlarged transverse section of the package taken generally along line 5—5 in FIG. 3;

FIG. 6 is a view similar to FIG. 5 illustrating a modified form of package; and

FIG. 7 is also a view similar to FIG. 5 illustrating still another modified form of package.

It has been found that a laminate consisting of at least one film of crystallized polyvinylidene chloride combined with a dissimilar flexible film or relatively rigid plastic material exhibits improved stretchability and formability providing the polyvinylidene chloride film exhibits substantially random crystal distribution throughout. Such a laminate is formed basically by the lamination of the polyvinylidene chloride film with the dissimilar plastic material while the polyvinylidene chloride film is in an amorphous, non-crystalline state, preferably supercooled. By dissimilar plastic material it is intended to include any suitable film or semi-rigid packaging material which is at least dissimilar to the polyvinylidene chloride film to an extent that its elongation is enhanced by reason of the lamination. Furthermore, by use of the term lamination it is meant to include adherence between the dissimilar materials to an extent that the resultant material is capable of being used as a unitary packaging material.

As a result of a practice of the invention, not only can improvements in elongation be realized, but the highly desirable packaging properties of polyvinylidene chloride, such as gas impermeability, can be utilized without the difficulties attendant to the use of polyvinylidene chloride film in its supercooled state. Of particular importance, the laminate stock of the invention when formed from flexible dissimilar films can be prepared, stored and used as roll stock with the operation of automatic packaging apparatus. This not only eliminates the problems arising from the necessity of combining primary extrusion of polyvinylidene chloride film with the basic package forming operation, but also eliminates the complexities arising from the careful handling of supercooled polyvinylidene chloride film and reduces the complexity of package forming apparatus needed. Of special importance is the fact that the unique laminated stock can be used in the operation of many different forms of packaging apparatus and the improved properties of polyvinylidene chloride film are available in heat sealing package forming procedures.

Depending upon the limitations imposed by the dissimilar plastic material of the laminate, the improved laminate can exhibit elongation of as much as substantially more than 300%. For example, it has been found that the lamination of polyvinylidene chloride film in its non-oriented crystalline condition with a polyvinyl chloride film permits elongation of well above 500%. However, while improved elongation is one aspect of the invention and constitutes an advance in the art, other substantial advantages are obtained from the mere lamination of polyvinylidene chloride film in its non-oriented crystallized state to many different types of flexible and relative rigid plastic materials.

Many attempts have been made by film manufacturers to successfully utilize the very low gas transmission rate of polyvinylidene chloride material in a packaging film. Due to the low stretchability of oriented crystallized polyvinylidene chloride film, it has been considered generally inadequate to produce a laminate film including as a part thereof this type of polyvinylidene chloride film. Accordingly, polyvinylidene chloride coatings have been applied to various plastic films, such as polyethylene, polystyrene, polypropylene, acetate and polyvinylchloride. Some of the basic problems arising from following this coating procedure utilizing the basic low melting point plastic films mentioned include the fact that in some instances the solvents used to apply the polyvinylidene chloride coating destroy at least to an undesirable extent the basic properties of the polyvinylidene chloride, particularly the low gas transmission rate. Furthermore, it is quite difficult to apply a suitable uniform coating of polyvinylidene chloride to a dissimilar film because of the basic chemical inertness of the coating material. It is quite difficult to utilize heat as an aid in removing the solvents used because the basic substrate films are heat sensitive and melt at low temperatures. In certain instances the substrate films which have been oriented with regard to their crystalline structure will shrink out of shape.

By practicing the teachings of the present invention, it is possible to very readily and efficiently apply a polyvinylidene chloride layer to different types of plastic materials without being involved with the foregoing difficulties. In this respect the method of the invention involves the use of amorphous or supercooled polyvinylidene chloride film and the application of the same directly to the substrate material thus completely eliminating the use of solvents and the necessity of subsequent heat treatment for solvent removal. The resultant laminate has the full extent of the gas transmission barrier properties of the polyvinylidene chloride film and the only limitations on the adequate stretchability of the laminate are those imposed by the characteristics of the substrate material. The laminate also retains all of the advantages of the characteristics of the substrate material such as sealability, heat formability, flexibility and rigidity. However, in this respect it will be borne in mind that the polyvinylidene chloride film is readily subject to sealing by heat as the same generally becomes fused at temperatures above about 150° C.

Additional advantages arising from the use of a polyvinylidene chloride film as a basic component of a laminate of the type described includes the fact that such film is unusually susceptible to plasticizers or adhesives which may be readily used in forming the lamination to bring about adequate adherence between the components thereof. Supercooled polyvinylidene chloride film is mechanically in a highly flowable condition so that it can gain intimate contact with the substrate material thus resulting in superior bonding or adherence thereto. The supercooled film can be maintained in its supercooled state for an appreciable time such as by controlled storage or the like. But of particular importance the supercooled film will retain its supercooled properties for a sufficient length of time under normal forming and laminating conditions so that the adherence or bonding does not have to be accomplished immediately following extrusion. Following the forming of the laminate, the supercooled polyvinylidene chloride film may be readily crystallized by standing under room temperature conditions over a period of time or by the application of suitable heat well below the melting point of the film. The resutlant crystallized film exhibits the excellent properties of being impervious to gases and liquids. The bonding or adhering of the supercooled polyvinylidene chloride film may be carried out under room temperature conditions thus eliminating the necessity of heat application. This is of particular importance where the substrate material used is subject to shrinkage upon heating. The cost of using an extruded supercooled polyvinylidene chloride film for laminating purposes is less than the cost involving the use of emulsions and coatings particularly in view of the fact that coating application under controlled conditions is rather difficult. In this respect the thickness of the polyvinylidene chloride film can be readily varied at the extruder whereas variation in coating thicknesses require additional passes through the coating equipment.

FIG. 1 illustrates one aspect of the method of the invention wherein an extruder 10 supplies a continuous polyvinylidene chloride film 11 which passes about a suitable guide roller 12 into a supercooling bath 13. This bath may be a water bath maintained within a temperature range of about 35° to 90° F., for example. A supply roll 14 of substrate film 15 feeds the continuous substrate film over a guide roller 16 into the bath 13 wherein it passes along an additional guide roller 17 into surface engagement with the film 11 between a plurality of pairs of laminating rollers 18. The laminate is thus formed immediately in the supercooling bath 13 with the unique supercooled properties of the polyvinylidene chloride film providing for intimate adherence with the substrate film.

The resultant laminate 19 passes from the bath 13 and is guided by a roller 20 through a suitable heating chamber 21 wherein the polyvinylidene chloride film is crystallized without stretching and the film exhibits random crystal distribution throughout. By way of example only, the temperature to which the polyvinylidene chloride film 11 is raised may be on the order of 150° F. This temperature normally is inadequate to adversely affect even the most heat sensitive films to which the polyvinylidene chloride film is adhered. However, crystallization of the polyvinylidene chloride film portion of the laminate can be brought about merely by storage or standing of the laminate under room temperature conditions over a period of time. In other words, crystallization is a function of time and/or heat to a sufficient extent that different procedures can be followed to obtain the desired type of crystallization. The finished laminate 19 is then passed over a guide roller 22 onto a collecting roll 23 which when filled can be used as a feed roll for automatic packaging apparatus.

FIG. 2 illustrates a slightly modified procedure used in forming the laminate of the invention. This procedure involves the use of the extruder 10 in continuously supplying the amorphous polyvinylidene chloride film 11 which passes over the guide roller 12 into the supercooling bath 13 without being combined with the substrate film therein. In this manner the film 11 is immediately supercooled by submersion in the room temperature water of the bath 13 as controlled by the guide rollers 24 therein. The supercooled film 11 passes out of the supercooling bath 13 over a guide roller 25 and is combined with a substrate film 26 supplied from a stock roll 27. Prior to the combining of the substrate film 26 with the supercooled film 11, a suitable feeder means 28 coats a surface of the substrate film 26 with a plasticizer or other suitable adhering or adhesive agent. The dissimilar films 11 and 26 are combined by the laminating rollers 29 and the resultant laminate is then passed through a suitable heater 21 or is subjected to other suitable treatment whereby the supercooled film 11 is crystallized. The resultant laminate is then collected on a stock roll 23 for subsequent use with packaging apparatus.

The use of a plasticizer to aid in the lamination of supercooled polyvinylidene chloride film with a dissimilar film is an example of a preferred form of lamination coming within the scope of the invention. As previously mentioned, polyvinylidene chloride film is compatible with many different types of plasticizers and such materials provide for adequate adhesion between supercooled polyvinylidene chloride film and a dissimilar plastic material. It is known that plasticizers can be used to establish a hermetic seal in cooperation with combined portions of supercooled polyvinylidene chloride film and a dissimilar film such as polyvinyl chloride, polyethylene, etc. Thus one of the preferred aspects of the present invention involves the utilization of a plasticizer in establishing a unitary laminate with efficient adhesion occurring between the supercooled polyvinylidene chloride film and the substrate film. The unique properties of supercooled polyvinylidene chloride film, such as the high formability thereof, provides for unusual adherence and combination of contacting surfaces of the film with a dissimilar plastic material. The amount of plasticizer used is normally just sufficient to establish a molecular layer of the material thus providing, in essence, a microfilm of the same between the laminants. Suitable plasticizers include commercially available and widely used "Santicizer 141" which is basically 2-ethylhexyldiphenyl phosphate. Other suitable plasticizers include diisobutyl adipate, dibutyl sebacate, "Citroflex A-4" (acetyl tributyl citrate), dioctyl adipate, diethylphthalate, and "Santicizer E-15" (ethyl phthalyl ethyl glycolate).

While the foregoing description of the method involving the diagrammatic illustrations of FIGS. 1 and 2 deals with the combining of a pair of flexible films, it will be understood that a plurality of films such as three or more may be combined in a suitable manner. Furthermore, the invention extends to the forming of a laminated stock involving the combining of amorphous polyvinylidene chloride film with semi-rigid materials. Under such circumstances the application of the film to the rigid materials may be brought about in any suitable manner with or without the use of adhering agents such as plasticizers or the like.

FIGS. 3–7 illustrate different forms of packages which may be prepared using the laminated stock of the invention and following the aforementioned procedures. It is emphasized that these particular packages are merely illustrative of some packages which may be formed using the laminated stock, and it must be borne in mind that many additional types of packages may be readily fabricated from the stock.

FIGS. 3–5 illustrate a known type of wiener package 30 formed from cooperating top and bottom laminated stock sheets 31 and 32. Each sheet is formed from an outer layer of polyvinylidene chloride film 33 and an inner layer of dissimilar flexible film 34 which may be of any suitable type such as polyvinyl chloride, polyethylene, etc. The laminated stock is formed in the manner described above and two separate continuous sheets 31 and 32 of the stock are collapsed about a plurality of wieners 35 using any known type of package forming apparatus, the wieners being banded by a known type of paper band 36 and placed between the laminated stock sheets during the package forming operation. Suitable package forming dies are used in confining the product in product enclosing portions of the laminated stock sheets 31 and 32 for package evacuation and shaping. Each package 30 is provided with a peripherally continuous seal area 37 which is formed in any suitable manner such as by heat sealing. The ready formability of the laminated stock permits ready extension or stretching thereof under package evacuation conditions to ultimately provide for complete conformance of the stock to the shape of the product. Permanent deformation of the laminated stock sheets 31 and 32 in tight contour engaging and conforming relation with the products provides for a relatively rigid package capable of withstanding normal handling during merchandising thereof. The presence of the outer layer 33 of polyvinylidene chloride film provides a gas tight package which exhibits extended shelf life.

FIG. 6 illustrates a wiener package 38 utilizing top and bottom sheets 39 and 40 of a slightly modified laminated construction. Each laminated sheet includes an outer layer of polyvinylidene chloride film 41, an inner layer of suitable dissimilar flexible film 42 and an intermediate microscopic adhering coating of a suitable plasticizer 43. As previously described, the plasticizer coating 43 provides for adequate adherence between the film layers 41 and 42 in supplying a laminated stock. Here again, the resultant stock is readily formable to the wiener product 35 and a continuous peripheral seal area 44 may be completed by heat sealing.

FIG. 7 illustrates a pre-formed tray-like package member 45 which is illustrative of the forming of laminated stock including a covering layer of polyvinylidene chloride film 46 suitably adhered to a dissimilar, at least semi-rigid base material 47. While the polyvinylidene chloride film 46 may be readily adhered directly to the base 47 while in its amorphous or supercooled condition, it is also possible to utilize an intermediate thin coating of plasticizer 48 to establish and maintain adequate adherence. The rigid base 47 provides substantial rigidity to the ultimate package with the multiple recess areas thereof being adapted to readily receive wieners. An overlying cover film of any suitable type, including the flexible laminated stock previously described, may be readily applied to the package to enclose the product therein with a peripheral seal being established by the application of heat or the like. The overlying layer of polyvinylidene chloride film 46 provides a highly efficient gas transmission barrier to the rigid base 47 thus providing a highly efficient package. Of course the pliability and stretchability of the polyvinylidene chloride film permits complete utilization of whatever similar properties the base material might exhibit, thus not applying any limitations to the use of the base during package forming operations.

Supercooled polyvinylidene chloride film may be adhered to many different substrate materials with advantages of varying degrees being realized upon use of the resultant laminate. In each instance the laminate will exhibit a highly desirable gas impermeability. Depending upon the substrate material selected, a very substantial degree of formability and stretchability can be obtained as previously described. With the more rigid substrate materials the amount of available stretchability may of course be quite limited as imposed by the limitations of the substrate materials, but at least the substrate materials are not limited in any respect by the presence of the polyvinylidene film. Furthermore, the relatively high melting point of the polyvinylidene chloride film permits softening of the more rigid substrate material for increased formability thereof and the high degree of stretchability of the polyvinylidene chloride film readily accommodates the increased stretching or forming of the substrate material. While in certain instances the term "plastic" is applied herein generally to define suitable substrate materials, it will be borne in mind that this term is used in its broad sense implying at least the connotation of pliability. For example, the supercooled polyvinylidene chloride film can advantageously be laminated with formable Kraft paper which preferably is creped to permit elongation.

The following examples of laminated stock and the methods of preparing the same are merely illustrative of certain practices of the invention and are not intended to limit the scope of the invention. In each instance the polyvinylidene chloride film used is commercially identified as "864 Saran" which basically is a copolymer of approximately 85% vinylidene chloride and 15% vinyl chloride. It will be understood that polyvinylidene chloride powder is available with varying compositions and that this particular form of the material is merely illustrative of a suitable type for use in carrying out the purposes of the invention.

EXAMPLE I

Laminated stock was formed from an extruded amorphous polyvinylidene chloride film having a thickness of approximately 2.2 mils which was laminated while in the amorphous state to an extruded film of plasticized polyvinyl chloride having a thickness of approximately 3.3 mils. Each film was formed simultaneously by extrusion and combined by laminating rollers in a supercooling water bath maintained at room temperature. The polyvinyl chloride film was plasticized with approximately 75 parts of plasticizer for each 100 parts of resin. The resultant laminated film was held at room temperature for approximately three days during which time the polyvinylidene chloride film crystallized and exhibited substantially random crystal distribution. Samples of the laminated stock were tested on an Instron tensile tester and the elongation and tensile strength were determined at chart and cross head speeds of five inches per minute at room temperature. The stock exhibited an elongation of 490% and an ultimate strength of 2,760 p.s.i. Samples of the stock were readily vacuum formed or shaped into package forming die cavities with and without the application of heat. In this respect the stock was found to be readily formable under both hot and cold conditions.

EXAMPLE II

Amorphous polyvinylidene chloride film having a thickness of 2 mils was laminated with a substrate flexible film laminate previously prepared. The substrate film laminate consisted of a film layer of Spencer polyethylene copolymer 7005 (an ethylene-acrylate copolymer) having a thickness of about 1.3 mils and extrusion laminated to a film of low density polyethylene (density 0.92) having a thickness of 1.3 mils. The laminated stock was prepared in the same manner as described in Example I and the polyvinylidene chloride film thereof was crystallized. This resultant laminate upon similar testing exhibited an elongation of 550% and an ultimate tensile strength of 2,490 p.s.i. at room temperature. The stock was readily formable under vacuum in package forming dies in accordance with known package forming practices.

EXAMPLE III

Polyvinylidene chloride film having a thickness of 2.2 mils was formed by extrusion and immediately supercooled in a water bath maintained at room temperature. To illustrate the ability to maintain the supercooled properties of the polyvinylidene chloride film, this film was stored under temperature conditions of approximately minus 60° F. for an indefinite period. The film was ultimately laminated with a prepared polyethylene film having a thickness of 1.5 mils, the polyethylene film having been coated with a polyvinylidene chloride lacquer along one surface thereof and further coated on this lacquered surface with a microscopic layer of diethyl phthalate plasticizer. The supercooled and amorphous polyvinylidene chloride film was applied to the polyethylene film in contact with the plasticizer coated side thereof and the resultant laminate was crystallized with regard to the polyvinylidene chloride film component thereof. Upon testing the laminate stock exhibited an elongation of 320% and an ultimate tensile strength of 2,320 p.s.i. at room temperature.

EXAMPLE IV

A supercooled polyvinylidene chloride film having a thickness of 2.2 mils was laminated to a Mylar film having a thickness of 0.5 mil. The Mylar film was coated along one side with a polyvinylidene chloride lacquer, this type of film being commercially available for packaging purposes. For lamination purposes, the polyvinylidene chloride lacquer surface of the Mylar film was provided with a thin coating of diethyl phthalate plasticizer and the supercooled polyvinylidene chloride film was contacted therewith following the procedures of Example III. The resultant crystallized laminate stock exhibited an elongation of 155% and an ultimate tensile strength of 6,120 p.s.i. at room temperature.

EXAMPLE V

Amorphous polyvinylidene chloride film having a thickness of 1.9 mils was laminated with semi-rigid ethyl cellulose having a thickness of 10 mils. The plasticizer diethyl phthalate was applied to the laminating surface of the ethyl cellulose as a thin coating. The crystallized laminate stock exhibited an elongation of 90% and an ultimate tensile strength of 8,700 p.s.i. at room temperature. This stock was adequately stretchable and formable under vacuumizing conditions in package forming apparatus to form an efficient wiener-type package of the nature illustrated in the accompanying drawings.

EXAMPLE VI

Amorphous polyvinylidene chloride film having a thickness of 2 mils was laminated to an extruded semi-rigid sheet of polyvinyl chloride having a thickness of 5.3 mils. The laminating surface of the vinyl sheet was coated with diethyl phthalate plasticizer. Elongation of the crystallized laminate was 260% and the ultimate tensile strength was 7,550 p.s.i. at room temperature. Here again, the laminate stock was readily usable in conventional packaging apparatus for the forming of wiener-type packages of the nature illustrated.

EXAMPLE VII

Amorphous polyvinylidene film having a thickness of 2.3 mils was laminated with diethyl phthalate coated, semi-rigid polystyrene having a thickness of 10 mils. The resultant crystallized laminate exhibited an elongation of 110% and an ultimate tensile strength of 4,920 p.s.i. at room temperature. Here again, the laminate was readily formable in package forming equipment in the shaping of a wiener-type package of the nature illustrated.

EXAMPLE VIII

Supercooled polyvinylidene chloride film having a thickness of 2 mils was laminated to a flexible sheet of rubber hydrochloride having a thickness of 1.2 mils. In carrying out the lamination, the rubber hydrochloride film (known as Pliofilm) was preliminarily heated with a hot air blast to 200 to 250° F. and was permitted to cool for approximately 5 minutes at room temperature. This preliminary heating established a tackiness in the substrate material and illustrates ready adhesion of supercooled polyvinylidene chloride film to substrate material which is not fully crystallized. Upon subsequent crystallization of the lamination, an elongation of 350% was obtained and an ultimate tensile strength of 2,030 p.s.i. at room temperature was realized.

The foregoing examples illustrate the ready lamination of supercooled polyvinylidene chloride film to many different types of substrate material. In each instance of course the polyvinylidene chloride film layer was crystallized without working so that substantially random crystal distribution occurred throughout. The number of layers of laminants used can vary considerably and the laminated stock formed can be readily combined in plural laminate form to increase the overall thickness of the material and without substantial reduction of desirable elongation properties. In this respect two laminates prepared in accordance with the procedure of Example I have been combined to form a combination laminate using a suitable pressure sensitive adhesive. In testing this type of laminate it was noted that elongation of at least 300% was available as during the testing the particular adhesive used failed at this level of elongation. Also at this failure an ultimate tensile strength of 2,660 p.s.i. at room temperature had been recorded.

Obviously certain modifications and variations of the invention as hereinbefore set forth may be made without departing from the spirit and scope thereof, and therefore only such limitations should be imposed as are indicated in the appended claims.

We claim:
1. Laminated stock for packaging use, said stock comprising at least one laminant of flexible polyvinylidene chloride film adhered to another laminant of dissimilar plastic material, said polyvinylidene chloride film having been adhered to said other laminant while said film is in an amorphous condition without any substantial attendant stretching, said polyvinylidene chloride film being crystallized with substantially random crystal distribution throughout, said laminants being adhered through a thin film of plasticizer extending between the same and compatible with said laminants.

2. The method of preparing laminated stock for packaging use, said method comprising extruding a film of polyvinylidene chloride, combining said film with a dissimilar plastic material to form a laminate, and thereafter crystallizing said polyvinylidene chloride film, the steps of said method being carried out without attendant stretching of said polyvinylidene chloride film with said film exhibiting substantially random crystal distribution throughout.

3. The method of preparing laminated stock for packaging use, said method comprising extruding a film of polyvinylidene chloride, supercooling said film to maintain the same in an amorphous state, combining said film with a dissimilar plastic material to form a laminate, and thereafter crystallizing said polyvinylidene chloride film, the steps of said method being carried out without attendant stretching of said polyvinylidene chloride film with said film exhibiting substantially random crystal distribution throughout.

4. The method of claim 3 wherein said polyvinylidene chloride film is supercooled by continuously passing the same through a water bath immediately following extrusion thereof.

5. The method of preparing laminated roll stock for packaging use, said method comprising extruding a film of polyvinylidene chloride, combining said film with a dissimilar flexible packaging film to form a laminate, and thereafter crystallizing said polyvinylidene chloride film the steps of said method being carried out without attendant stretching of said polyvinylidene chloride film with said film exhibiting substantially random crystal distribution throughout.

6. The method of preparing laminated roll stock for packaging use, said method comprising extruding a film of polyvinylidene chloride, supercooling said film to maintain the same in an amorphous state, combining said film with a dissimilar flexible packaging film to form a laminate, and thereafter crystallizing said polyvinylidene chloride film, the steps of said method being carried out without attendant stretching of said polyvinylidene chloride film with said film exhibiting substantially random crystal distribution throughout.

7. The method of claim 6 wherein said polyvinylidene chloride film is supercooled by continuously passing the same through a water bath immediately following extrusion thereof.

References Cited
UNITED STATES PATENTS

| | | | |
|---|---|---|---|
| 2,320,112 | 5/1943 | Wiley | 264—28 |
| 2,679,969 | 6/1954 | Richter | 229—3.5 |
| 2,682,974 | 7/1954 | Smith | 161—254 X |
| 2,878,154 | 3/1959 | Cheney et al. | 156—198 |
| 2,968,576 | 1/1961 | Keller et al. | 161—254 X |
| 3,037,868 | 6/1962 | Rosser | 99—171 |

EARL M. BERGERT, *Primary Examiner.*

HAROLD ANSHER, *Examiner.*